No. 763,327. PATENTED JUNE 21, 1904.
J. ROCHE.
FLOATING WATER FILTER.
APPLICATION FILED NOV. 14, 1903.
NO MODEL. 2 SHEETS—SHEET 1.
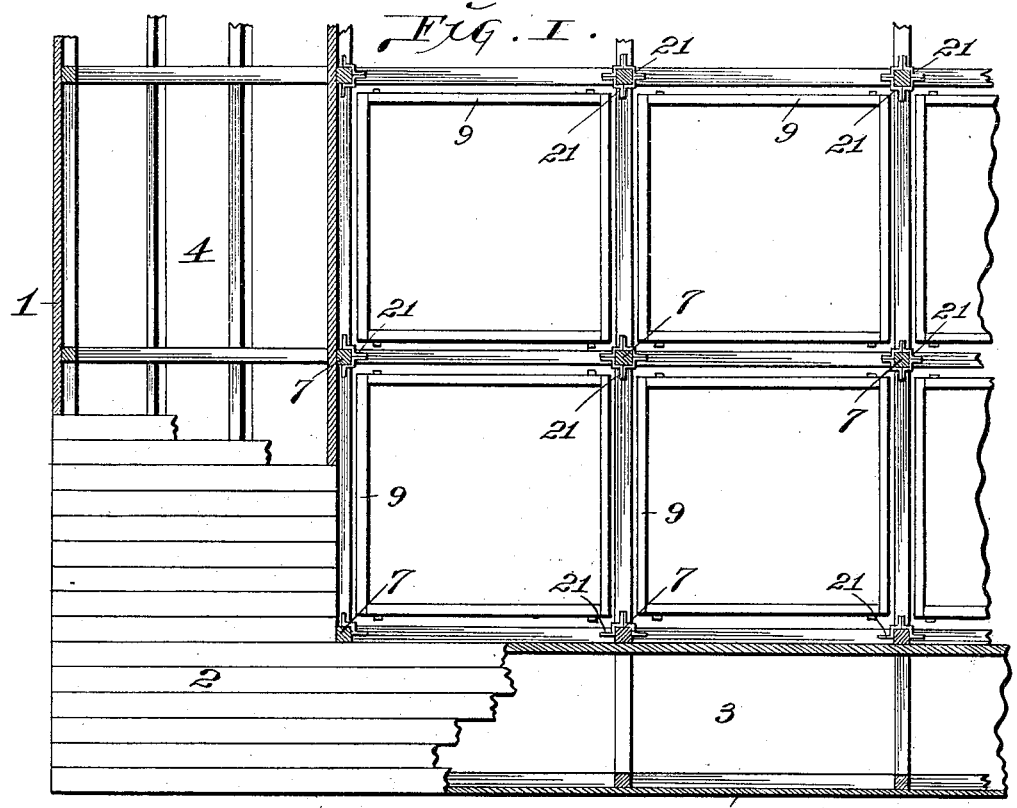
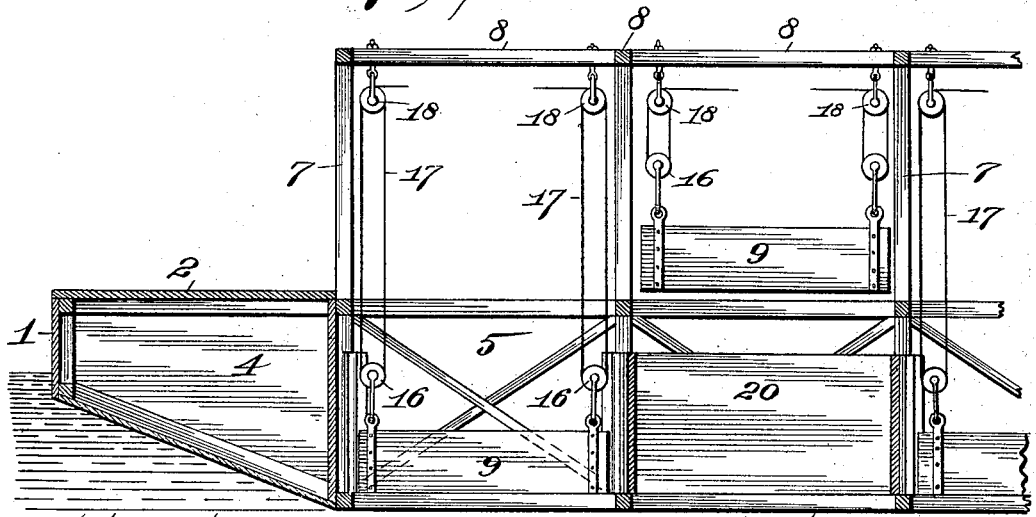
Attest:
M. P. Smith
A. S. Alexander
Inventor:
John Roche.
By Knight Bros.
Attys.

No. 763,327. PATENTED JUNE 21, 1904.
J. ROCHE.
FLOATING WATER FILTER.
APPLICATION FILED NOV. 14, 1903.
NO MODEL. 2 SHEETS—SHEET 2.
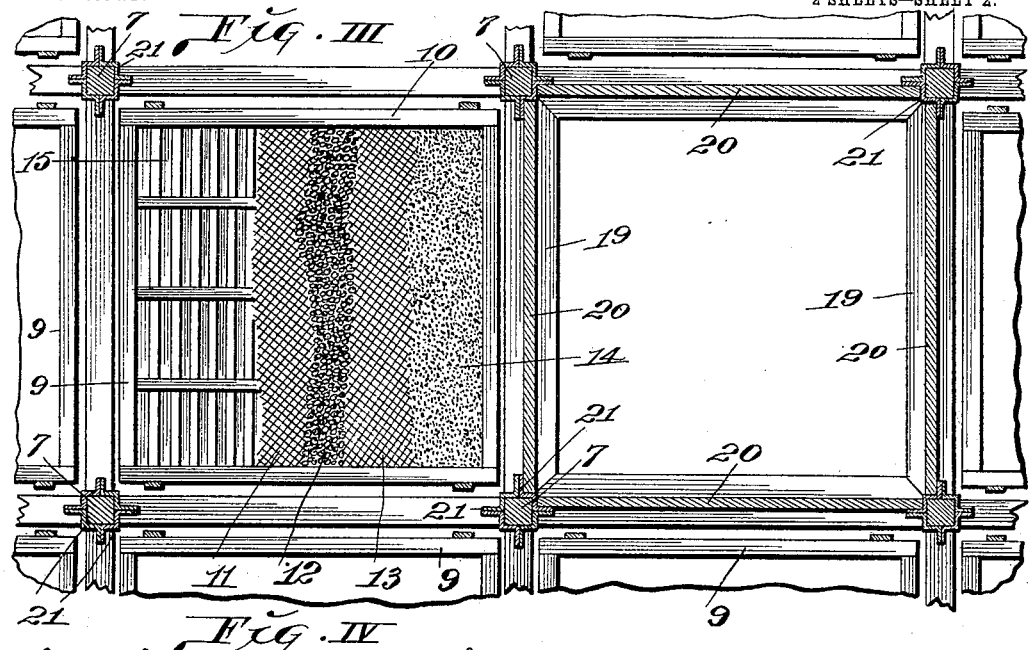
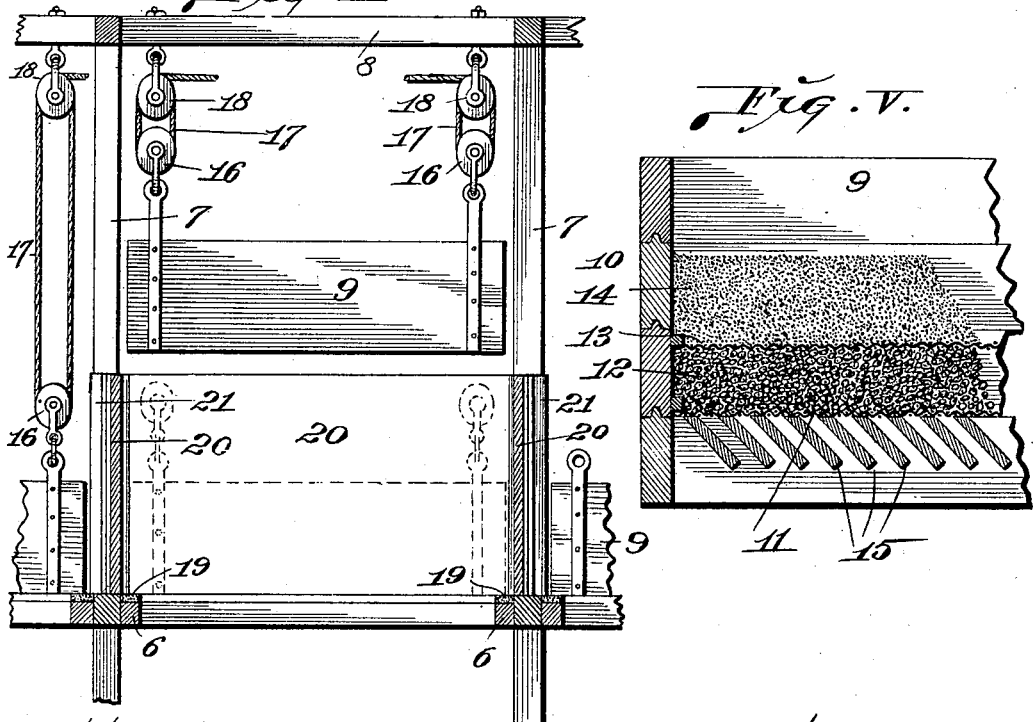
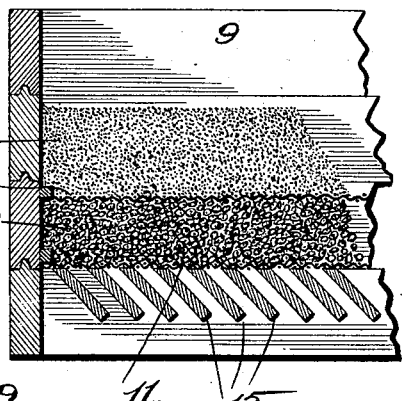
Attest:
M. F. Smith
A. V. Alexander
Inventor:
John Roche
By Knight Bros
attys.

No. 763,327. Patented June 21, 1904.

UNITED STATES PATENT OFFICE.

JOHN ROCHE, OF MONETT, MISSOURI, ASSIGNOR OF THREE-FIFTHS TO GEORGE A. HANCOCK, OF SPRINGFIELD, MISSOURI, AND ERNEST L. THESIERES, OF ST. LOUIS, MISSOURI.

FLOATING WATER-FILTER.

SPECIFICATION forming part of Letters Patent No. 763,327, dated June 21, 1904.

Application filed November 14, 1903. Serial No. 181,171. (No model.)

*To all whom it may concern:*

Be it known that I, JOHN ROCHE, a citizen of the United States, residing at Monett, in the county of Barry and State of Missouri, have invented certain new and useful Improvements in Floating Water-Filters, of which the following is a full, clear, and exact description, reference being had to the accompanying drawings, forming part of this specification.

My invention relates to a water-filter so constructed as to be floated in the water of a river or other body of water, the construction, briefly stated, comprising a hull having an interior framework on which filter-boxes are supported and means whereby said boxes may be elevated for the purpose of cleansing them or for repairs; and the invention further consists in means for preventing water from overflowing into the adjacent filter-compartments when one of the filter-boxes is removed.

The invention further consists in the details of construction hereinafter fully described, and pointed out in the claims.

Figure I is a top or plan view of my filter with the vessel-hull and superstructure shown in horizontal section. Fig. II is a vertical longitudinal section taken through one end of the filter with parts shown in elevation. Fig. III is an enlarged view, partly in plan and partly in horizontal section, of a portion of the interior structure of the filter. Fig. IV is an enlarged elevation, with parts shown in vertical section, of one of the filter-boxes in elevated position, the framework inclosing it, and the casing surmounting the filter-box seat as utilized when the filter-box is raised. Fig. V is an enlarged vertical section of a portion of one of the filter-boxes.

1 designates the hull of a vessel, which forms the support of my filter, that is provided with a floor 2 and contains side chambers 3 (see Fig. I) and end chambers 4. (See Figs. I and II.) Within this hull is a framework 5, that is composed of horizontal, vertical, and cross timbers, of which 6 represents the bottom sills and 7 the uprights. The uprights 7 project upwardly beyond the top level of the hull 1 and with surmounting stringers 8 constitute an upper framework or superstructure. There may be as many of the uprights 7 as it is desired to incorporate in the structure of the filter, and between the squares formed by the positioning of the uprights are filter-sections in which the filter-boxes are located, as seen most clearly in Fig. I.

9 designates the filter-boxes, which, as seen in Figs. III and V, are composed of a case 10, within which is positioned a lower perforated support 11, surmounted by a layer or bed 12 of charcoal; a second perforate dsupport 13, surmounting the bed of charcoal, and a bed 14, of sand, surmounting said last-named support.

15 designates a series of slats inclined rearwardly beneath the beds of filtering material and their supports, said slats serving as a medium to protect the lower support 11 from injury by any object floating into a position beneath the filter-box. Attached to each filter-box are pulley-blocks 16, that are connected by tackle 17 to surmounting pulley-blocks 18, which are suspended from the superstructure-stringers 8. Through the medium of this block and tackle the filter-boxes may be raised and lowered in their sections, as illustrated in Figs. II and IV, whenever it is desirable to cleanse them or make repairs therein. Mounted on the sills 6 of the sectional framework are seats 19, upon which the lower edges of the filter-box cases seat when said filter-boxes are in lowered position and filtering action is taking place therein. These packing-seats serve to exclude the passage of impure water beneath the lower edges of the box-cases to pass upwardly therearound, thereby preventing the unfiltered water from rising and gaining access into the upper portions of the boxes into which the filtered water passes after percolating through the beds of filtering material therein.

When the filter-boxes are seated as explained, the impure water in the body in which the filter is placed rises interiorly of the filter-boxes from their lower ends and seeps through the beds of filtering material therein to be purified and clarified ready for withdrawal from the upper portions of the boxes by any suitable means, such as a system of pipes leading from the boxes to a suction-pump.

It is necessary that when the filter-boxes are elevated from their seats in a manner and for the purposes referred to the impure water in the body in which the filter is placed be prevented from flowing from the filter-section in which the box is elevated into the adjacent compartments and thereby mingling with the water that has been filtered by passing therethrough. To this end I utilize a series of division-boards 20, (see Figs. II, III, and IV,) which are placed in upright positions between the uprights 7 of the superstructure-framework in the section in which the filter-box is to be elevated, so as to surround and surmount the seats of said boxes and prevent the water which rises in said section from overflowing into the surrounding filter-boxes. These division-boards are of greater height than the filter-boxes, their upward extent being greater than that it is possible for the water to gain when it enters into the section in which the filter-box is elevated, and the boards are confined and supported by angle-brackets 21, that are applied to the uprights 7 to receive them.

I claim as my invention—

1. In a floating water-filter, the combination with a vessel-hull provided with an interior framework having lower sills, and packing-seats surmounting said sills; of filter-boxes positioned upon said packing-seats, and means for raising and lowering said filter-boxes.

2. In a floating water-filter, the combination of a vessel-hull provided with an interior framework having lower sills, packing-seats surmounting said sills, and removable filter-boxes arranged to rest upon said packing-seats, substantially as set forth.

3. In a floating water-filter, the combination of a vessel-hull provided with an interior framework having lower sills, packing-seats surmounting said sills, filter-boxes arranged to rest upon said packing-seats, and means for raising and lowering said filter-boxes with respect to their seats, substantially as set forth.

4. In a floating water-filter, the combination of a vessel-hull provided with an interior framework divided into sections, filter-boxes positioned in said framework-sections, means for raising and lowering said filter-boxes, and division-boards in said sections for restricting the flow of water entering thereinto when the filter-boxes are elevated, substantially as set forth.

JOHN ROCHE.

In presence of—
E. S. KNIGHT,
NELLIE V. ALEXANDER.